United States Patent
Sheik et al.

(10) Patent No.: US 9,622,080 B2
(45) Date of Patent: Apr. 11, 2017

(54) CELL UPDATE MESSAGE MANAGEMENT

(71) Applicant: QUALCOMM Incorporated, San Diego, CA (US)

(72) Inventors: Ansah Ahmed Sheik, Eluru (IN); Chetan Gopalakrishnan Chakravarthy, San Diego, CA (US); Liangchi Hsu, San Diego, CA (US); Sarath Kumar Pujari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/681,883

(22) Filed: Apr. 8, 2015

(65) Prior Publication Data

US 2016/0112373 A1 Apr. 21, 2016

Related U.S. Application Data

(60) Provisional application No. 62/066,545, filed on Oct. 21, 2014.

(51) Int. Cl.
*H04M 3/16* (2006.01)
*H04W 12/08* (2009.01)
(Continued)

(52) U.S. Cl.
CPC ........... *H04W 12/08* (2013.01); *H04W 28/06* (2013.01); *H04W 12/04* (2013.01)

(58) Field of Classification Search
CPC ..... H04W 12/06; H04W 12/08; H04W 12/04; H04W 12/10; H04W 76/02;
(Continued)

(56) References Cited

U.S. PATENT DOCUMENTS 8,374,609 B2 * 2/2013 Somasundaram .... H04W 24/10
370/331
9,265,087 B2 * 2/2016 Lee ......................... H04L 63/20
(Continued)

FOREIGN PATENT DOCUMENTS

| EP | 2 506 614 A1 | 10/2012 |
| GB | 2512301 A | 10/2014 |
| WO | WO-2008/072005 A2 | 6/2008 |

OTHER PUBLICATIONS

International Search Report and Written Opinion—PCT/US2015/051959—ISA/EPO—Dec. 3, 2015. (13 total pages).
(Continued)

*Primary Examiner* — Jean Gelin
(74) *Attorney, Agent, or Firm* — Arent Fox LLP

(57) ABSTRACT

Techniques for managing cell update messages are described here. An information element (IE) that indicates the security status of a user equipment (UE) may be included in the cell update message when a cell update procedure is triggered during an ongoing security mode procedure. To ensure the size of the cell update message is equal to or smaller than the transport format size, other IEs may be omitted from the cell update message if the security mode procedure is in progress. Alternatively, if the security mode procedure is not in progress, there may not be a need to update the security status of the UE and, thus, the IE that indicates the security status may be omitted from the cell update message to reduce the size of the cell update message.

37 Claims, 10 Drawing Sheets

(51) Int. Cl.
*H04W 28/06* (2009.01)
*H04W 12/04* (2009.01)

(58) Field of Classification Search
CPC . H04W 76/046; H04W 76/06; H04W 76/068; H04W 28/06; H04W 36/00; H04W 28/0289; H04W 28/08; H04W 28/16
USPC .... 455/410, 411, 414.1, 412.1, 412.2, 452.1, 455/452.2, 453, 443, 446
See application file for complete search history.

(56) References Cited

U.S. PATENT DOCUMENTS

| | | | | |
|---|---|---|---|---|
| 2007/0249284 | A1* | 10/2007 | Asami | G08G 1/096716 455/39 |
| 2008/0200171 | A1* | 8/2008 | Jeong | H04J 11/0093 455/436 |
| 2009/0154408 | A1* | 6/2009 | Jeong | H04W 76/02 370/329 |
| 2010/0202618 | A1* | 8/2010 | Yang | H04L 63/068 380/277 |
| 2012/0208537 | A1 | 8/2012 | Edge et al. | |
| 2012/0275340 | A1 | 11/2012 | McGann | |
| 2013/0100820 | A1* | 4/2013 | Song | H04W 52/0216 370/241 |
| 2013/0343280 | A1* | 12/2013 | Lee | H04L 63/20 370/328 |
| 2014/0010180 | A1* | 1/2014 | Lee | H04W 48/02 370/329 |
| 2014/0022989 | A1* | 1/2014 | Chakravarthy | H04W 60/02 370/328 |
| 2014/0313889 | A1* | 10/2014 | Jeong | H04W 76/028 370/230 |
| 2015/0072647 | A1* | 3/2015 | Rogers | H04W 12/08 455/411 |
| 2016/0150566 | A1* | 5/2016 | Lee | H04W 74/085 370/329 |

OTHER PUBLICATIONS

ST-Ericsson, "Corrections to Cell Update when Cell Update message size exceeds the used transport format size", 3GPP TSG-WG2 Meeting #80, 3GPP Draft; 25331_CR5286R1_(REL-10)_R2-125950, 3rd Generation Partnership Project (3GPP), Mobile Competence Centre ; 650, Route Des Lucioles ; F-06921 Sophia-Antipolis Cedex ; France no. New Orleans; Nov. 12, 2012-Nov. 16, 2012 Dec. 13, 2012 (Dec. 13, 2012), XP050664460, 10 Pages, Retrieved from the Internet: URL: http://www.3gpp.org/ftp/tsg_ran/WG2_RL2/Specifications/201212_draft_specs_after_RAN_58/ [retrieved on Dec. 13, 2012].

* cited by examiner

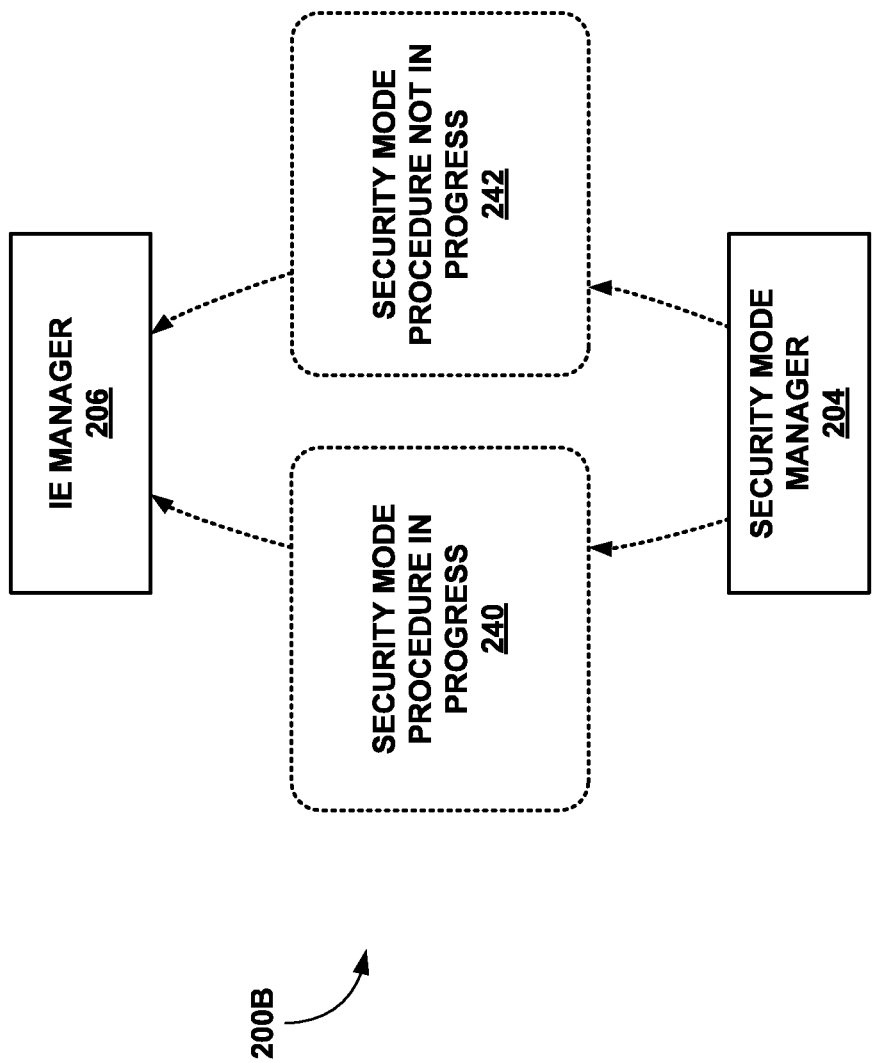

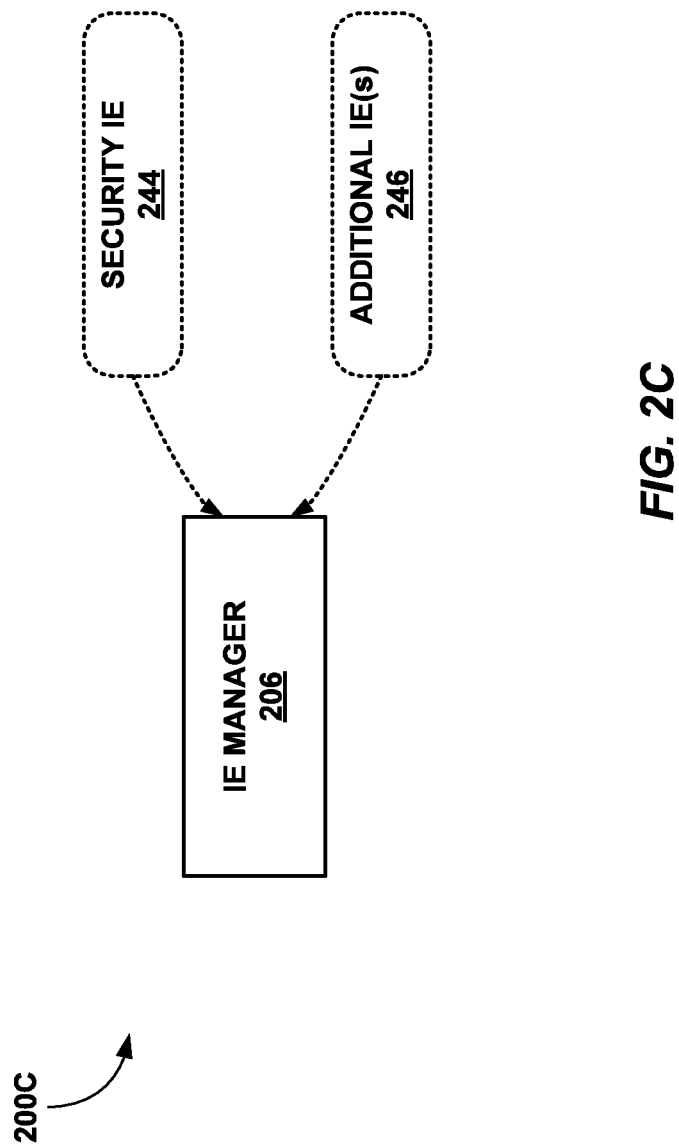

CELL UPDATE MESSAGE MANAGEMENT

CROSS-REFERENCE

This is an application claiming priority to Provisional Application No. 62/066,545 entitled "TECHNIQUES FOR CELL UPDATE MESSAGE MANAGEMENT" filed on Oct. 21, 2014, and assigned to the assignee hereof and hereby expressly incorporated by reference herein.

BACKGROUND

The described aspects relate generally to wireless communication systems. More particularly, the described aspects relate to techniques for cell update message management.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. Furthermore, UMTS supports multiple radio access bearer (multi-RAB) capability, which allows simultaneous network communication with a user equipment (UE) over two or more radio access bearers. Therefore, in an aspect, multi-RAB functionality in UMTS allows for a UE to concurrently transmit and receive packet-switched (PS) and circuit-switched (CS) data.

When a UE operates in communication with a network, the UE may receive a security mode command that triggers a process to reconfigure security related parameters. The process to reconfigure security related parameters may be referred to as a security mode procedure or simply a security procedure. During the security mode procedure, a Radio Resource Control (RRC) layer of the UE may configure other lower layers with the reconfigured security related parameters and may send a Security Mode Complete message to the network when the security mode procedure is complete. The network may respond to the Security Mode Complete message with an acknowledgement message. If a cell update procedure is triggered before the UE gets the acknowledgement message from the network in response to the Security Mode Complete message, the UE may have to abort the ongoing security mode procedure and continue with the cell update procedure as if the security mode command had not been received. Since the network does not have knowledge of whether the UE has reconfigured the security related parameters, the network and the UE may not be synchronized as to the current security status of the UE. To address this issue, a new information element (IE), e.g., "Security Revert Status Indicator," may be included in a cell update message to indicate the security status of the UE and whether the UE has applied the new security configuration provided in the security mode command.

However, a cell update message may not be transmitted to the network from the UE if the size of the cell update message is greater than a transport format size determined in the 3GPP specification. With the inclusion of the Security Revert Status Indicator IE, and perhaps the inclusion of other IEs as well, the size of the cell update message may be greater than the transport format size, which may impact whether the cell update message can be sent by the UE to the network in accordance with current communications protocols.

Therefore, there is a desire for techniques for managing information elements in a cell update message to facilitate the transmission of the cell update message from the UE to the network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for managing cell update messages. An example method may include determining whether a size of a message to be transmitted from a UE to a network, is greater than a size threshold. In addition, the example method may include, in response to a determination that the size of the message is greater than the size threshold, whether a security mode procedure is in progress at the UE. Further, the example method may include omitting from the message one or more IEs, wherein which one or more IEs are omitted is based on the determination of whether the security mode procedure is in progress, and wherein the size of the message with the one or more IEs omitted is smaller than or equal to the size threshold.

An example apparatus may include means for determining whether a size of a message to be transmitted from a UE to a network, is greater than a size threshold. In addition, the example apparatus may include means for determining, in response to a determination that the size of the message is greater than the size threshold, whether a security mode procedure is in progress at the UE. Further, the example apparatus may include means for omitting from the message one or more IEs, wherein which one or more IEs are omitted is based on the determination of whether the security mode procedure is in progress, and wherein the size of the message with the one or more IEs omitted is smaller than or equal to the size threshold.

An example computer-readable medium storing computer executable code may include code for determining whether a size of a message to be transmitted from a UE to a network, is greater than a size threshold. In addition, the example computer-readable medium may include code for determining, in response to a determination that the size of the message is greater than the size threshold, whether a security mode procedure is in progress at the UE. Further, the example computer-readable medium may include code for omitting from the message one or more IEs, wherein which one or more IEs are omitted is based on the determination of whether the security mode procedure is in progress, and wherein the size of the message with the one or more IEs omitted is smaller than or equal to the size threshold.

Another example apparatus may include a message size detector configured to determine whether a size of a message to be transmitted from a UE to a network, is greater than a size threshold. In addition, the example apparatus may include a security mode manager configured to determine, in response to a determination that the size of the message is greater than the size threshold, whether a security mode procedure is in progress at the UE. Further, the example apparatus may include an IE manager configured to omit from the message one or more IEs, wherein which one or more IEs are omitted is based on the determination of whether the security mode procedure is in progress, wherein the size of the message with the omitted one or more IEs is smaller than or equal to the size threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2B is a diagram illustrating one or more states associated with a security mode procedure in cell update message management operations;

FIG. 2C is a diagram illustrating one or more information elements associated with cell update message management operations;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

An information element (IE) that indicates the security status of the UE may be included in the cell update message when a cell update procedure is triggered during an ongoing security mode procedure. An IE may refer to a parameter or indicator contained within a signaling message, where the parameter or indicator is associated with a particular characteristic, feature, or measurable factor of operations of the UE. The cell update message may be transmitted over a common channel. However, a common channel may only be able to handle small amounts of data. For example, a cell update message may be limited to a certain transport format size (e.g., 168 bits) when transmitted over a common channel without segmentation. If the cell update message is greater than the transport format size, then a cell update message failure may occur.

To ensure the size of the cell update message is equal to or smaller than the transport format size, IEs other than the IE that indicates the security status of the UE may be omitted (e.g., not included) from the cell update message if the security mode procedure is in progress. Alternatively, if the security mode procedure is not in progress, there may not be a need to update the security status of the UE and, thus, the IE that indicates the security status may be omitted from the cell update message to reduce the size of the cell update message so that it meets the transport format size requirements. As referenced herein, a security mode procedure may refer to a process for the UE to update, reconfigure, or otherwise adjust one or more parameters related to the security status of the UE. The security mode procedure at the UE may be triggered by a security mode command received at the UE from the network.

Figure 1:
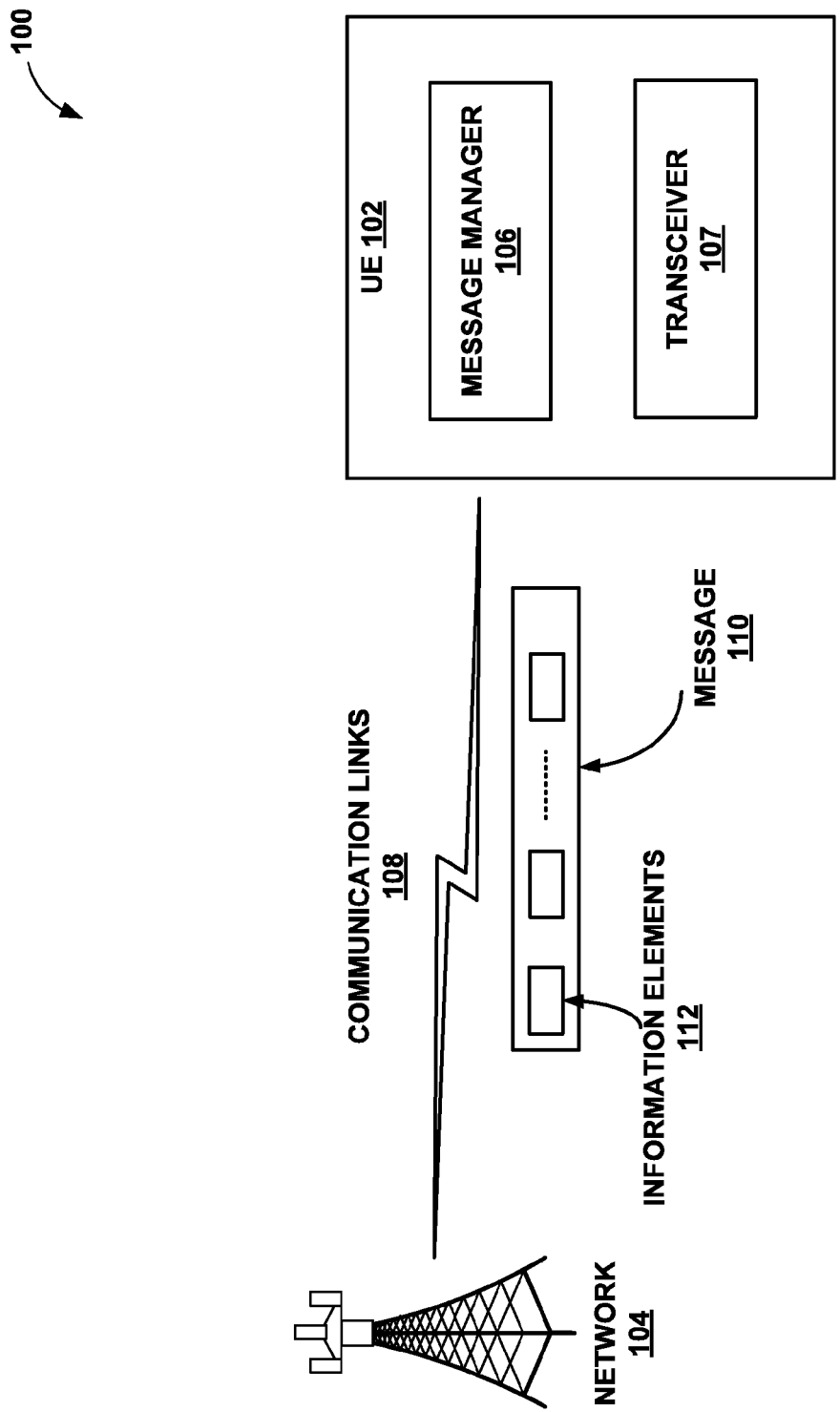
FIG. 1 is a diagram illustrating a wireless communication system in which cell update message management may be implemented.

Referring to FIG. 1, a wireless communication system 100 may include a UE 102 having one or more components for cell update message management. In an aspect, the term "component" as used herein may be one of the parts that make up a system, may be implemented as hardware, software, firmware, or any combination thereof, and may be further divided into other components. By operating in communication with network 104 via one or more communications links 108, UE 102 may be in a forward access channel (FACH) state to monitor the FACH to receive signaling messages or user data addressed to the UE, or any broadcast message via transceiver 107. Transceiver 107 may refer to one or more components configured to establish communications links 108 with network 104 and transmit and receive information to and from network 104.

In an aspect, UE 102 and/or transceiver 107 may receive a security mode command from network 104, which may trigger a security mode procedure in UE 102 to reconfigure security related parameters associated with UE 102. The security related parameters may include but need not be limited to ciphering parameters, validation parameters, parameters related to the integrity of messages (e.g., keying), and timing information. If a cell update procedure is triggered at UE 102 before the completion of the security mode procedure, a cell update message (e.g., message 110 in FIG. 1) that is transmitted from UE 102 to network 104, may include an information element (IE), e.g., one of information elements 112, to indicate that UE 102 has reconfigured the security related parameters in accordance with the security mode command or that UE 102 has aborted the security mode procedure due to an interruption caused by the triggering of the cell update procedure. As referenced herein, the IE that indicates the security status of UE 102 may be referred to as a security IE.

Since the inclusion of the security IE may involve additional bits, e.g., 5 bits, in the cell update message, message manager 106 may be configured to omit one or more IEs from the cell update message based on whether the security mode procedure is still in progress. By omitting one or more IEs from the cell update message, the message manager 106 may remove, delete, or otherwise not include those IEs when configuring, processing, or modifying the cell update message. That is, message manager 106 may be configured to determine whether the size of the cell update message is greater than a size threshold, e.g., the transport format size specified in 3GPP standard (see e.g., threshold 230 in FIG. 2A). If the size of the cell update message is equal to or smaller than the size threshold, UE 102 may transmit the cell update message to network 104 without having to adjust (e.g., reduce) the size of the cell update message for the transmission. If the size of the cell update message is greater than the size threshold, message manager 106 may be configured to further determine whether the security mode procedure is in progress in order to, for example, identify which IEs may be omitted from the cell update message, as well as the order or priority in which the IEs may be omitted from the cell update message, so that the size of the cell update message can be made the same as or smaller than the size threshold.

If message manager 106 determines that the security mode procedure is in progress, that is, the reconfiguration of security related parameters has not been completed, message manager 106 may be configured to omit non-critical IEs other than the security IE before having to omit the security IE from the cell update message to meet the size requirements. A non-critical IE may refer to an IE that need not be included as part of the cell update message for such a message to be successfully received and used by the network 104. If message manager 106 determines that the security mode procedure is not in progress (e.g., a recent security mode procedure has been completed), message manager 106 may be configured to omit the security IE before omitting other non-critical IEs from the cell update message. In this case, the security IE may be said to have a higher omission priority that the non-critical IEs as the security IE may be the first to be omitted to ensure that the cell update message meets the transport format size requirements.

In some examples, the security IE may refer to the "Security Revert Status Indicator" described in 3GPP specification. Other non-critical IEs may include "Support for Two DRX schemes in URA_PCH and CELL_PCH," "MBMS Selected Services," etc., which are described in, for example, TS 25.331, Section10.2.7 (Rel-12). As referenced herein, non-critical IEs may refer to the IEs indicating optional operations or status associated with transmission of UE 102. For example, non-critical IEs may include one or both of an IE for Measured Results on Random Access Channel (RACH) and an IE for Support for Two Discontinuous Reception (DRX) Schemes.

In an aspect, message manager 106 may revert to check the size of the cell update message after omitting an IE and may keep omitting one or more additional IEs until the size of the cell update message is equal to or smaller than the size threshold. Therefore, the message manager 106 may perform multiple iterative checks of the current size of the cell update message and may remove at least one additional IE at each check until the cell update message is equal to or smaller than the size threshold (e.g., transport format size).

Figure 2A:
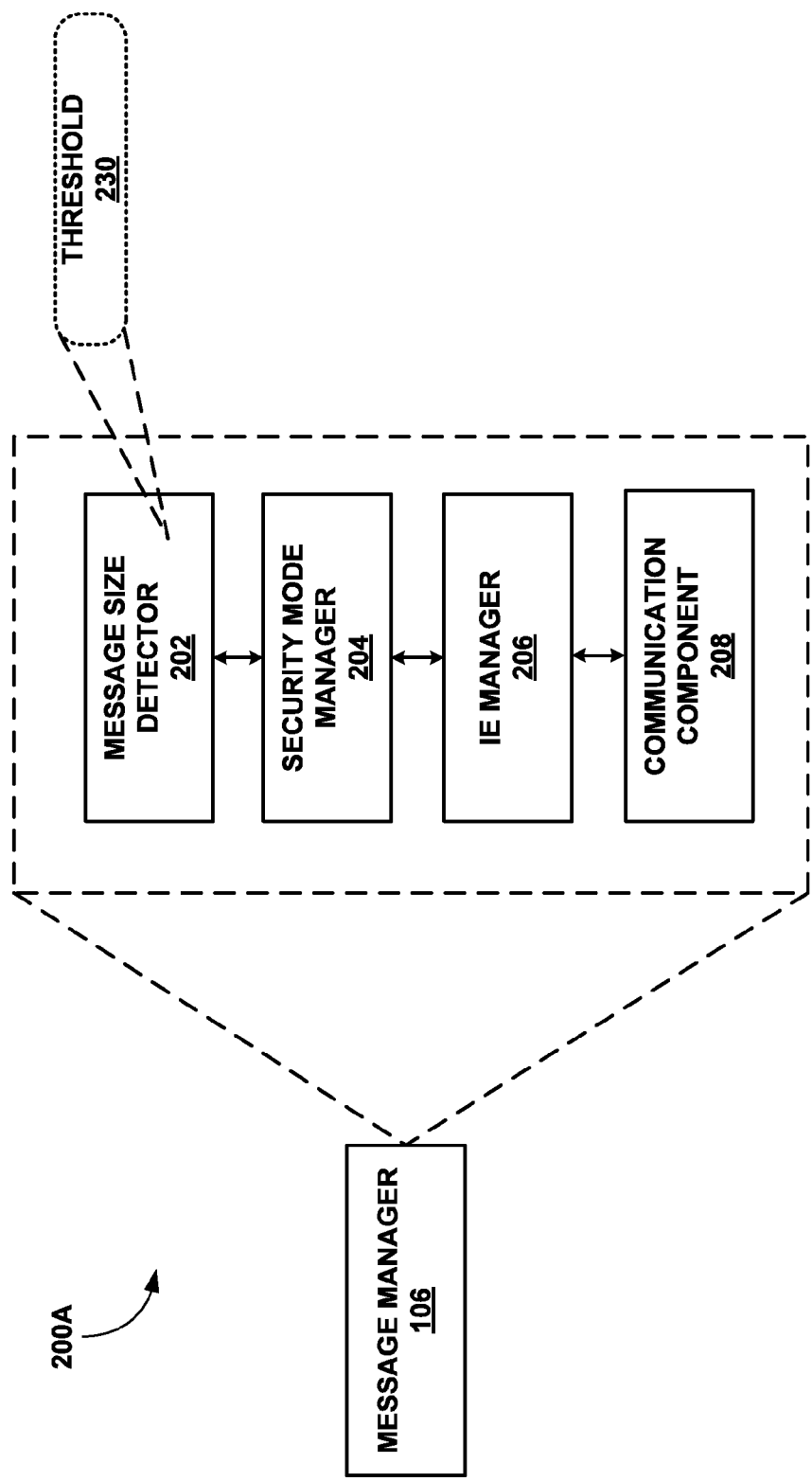
FIG. 2A is a block diagram illustrating one or more components by which cell update message management may be implemented.

Referring to FIG. 2A, one or more components of UE 102, by which cell update message management may be implemented, are illustrated in diagram 200 in addition to FIG. 1. As depicted, message manager 106 of FIG. 1 may include a message size detector 202, a security mode manager 204, an IE manager 206, and a communication component 208, each of which may be implemented as software, hardware, firmware, or any combination thereof at UE 102.

When UE 102, in PCH state, receives a paging type 1 message from network 104 (FIG. 1), a cell update procedure may be triggered to cause UE 102 to move to FACH state and to send a cell update message (e.g., message 110) to network 104. Before communication component 208 and/or transceiver 107 (FIG. 1) transmits the cell update message, message size detector 202 may be configured to determine whether the size of the cell update message is greater than the size threshold, e.g., threshold 230. The threshold 230 may represent a message size value stored in, or accessible by, the message size detector 202. The message size detector 202 may be configured to compare the message size value associated with the threshold 230 with a value associated with the size of the cell update message to determine whether the size of the cell update message is greater than the size threshold. If the size of the cell update message is equal to or smaller than the size threshold (e.g., transport format size), communication component 208 may send the cell update message to network 104 without any adjustments or modifications to the size of the cell update message. As referenced herein, PCH state may refer to a state in which the UE may not send or receive user data but can only monitor or receive system information blocks (SIBs) and paging information.

If the size of the cell update message is greater than the size threshold, security mode manager 204 may be configured to determine whether the security mode procedure is in progress. That is, the security mode manager 204 may be configured to identify different states associated with a security mode procedure in cell update message management operations. When the security mode procedure is found to be taking place (in progress), the security mode manager 204 may identify a first state, which may correspond to a state illustrated in FIG. 2B and referred to as security mode procedure in progress 240. When the security mode procedure is found not to be taking place (not in progress), the security mode manager 204 may identify a second state, which may correspond to a state also illustrated in FIG. 2B and referred to as security mode procedure not in progress 242. Based on the determination of whether the security mode procedure is in progress by security mode manager 204, IE manager 206 may be configured to omit the security IE, e.g., security IE 244 (FIG. 2C), or one or more of other non-critical IEs from the cell update message.

That is, if the security mode procedure is in progress (i.e., the first state described above is identified as active), IE manager 206 may omit one or more of other non-critical IEs from the cell update message before omitting the security IE. If the security mode procedure is not in progress (i.e., the second state described above is identified as active), IE manager 206 may omit the security IE from the cell update message before omitting other non-critical IEs.

In an aspect, each time IE manager 206 omits a non-critical IE and/or the security IE from the cell update message, message size detector 202 may be configured to determine if the size of the cell update message with the non-critical IE and/or the security IE omitted is greater than the size threshold. If the size of the cell update message is reduced by the omission(s) to a value that is equal to or smaller than the size threshold, IE manager 206 may not further omit any other IEs and communication component 208 and/or transceiver 107 in FIG. 1 may send to network 104 the cell update message with the one or more IEs omitted.

FIG. 2B is a diagram illustrating one or more states associated with a security mode procedure in cell update message management operations. For example, security mode manager 204 may determine that UE 102 is operating in a state in which a security mode procedure is in progress. The security mode procedure may be used to update, reconfigure, or otherwise adjust one or more parameters related to the security status of UE 102. The security mode procedure at UE 102 may be triggered by a security mode command received at UE 102 from the network. As described above, the security mode procedure in progress 240 illustrated in FIG. 2B may correspond to the in-progress state of the security mode procedure. The IE manager 206 may be informed that the security mode procedure in progress 240 is the current or active state associated with the security mode procedure and may manage the inclusion and/or omission of IEs in the cell update message based on this knowledge.

The security mode manager 204 may determine that UE 102 is operating in a state in which a security mode procedure is not in progress. That is, the security mode procedure has not been triggered or, if previously triggered, has now been completed. As described above, the security mode procedure not in progress 242 illustrated in FIG. 2B may correspond to the not-in-progress state of the security mode procedure. The IE manager 206 may be informed that the security mode procedure not in progress 242 is the current or active state associated with the security mode procedure and may manage the inclusion and/or omission of IEs in the cell update message based on this knowledge.

FIG. 2C is a diagram illustrating one or more information elements associated with cell update message management operations. These information elements or IEs may be included or omitted in the cell update message by the IE manager 206 based at least in part on the state associated with security mode procedure as described above with respect to FIG. 2B. The IEs can be abstractions representing data, and a format for the data, which may be inserted into a message such as a cell updated message. For example, security IE 244 may refer to the "Security Revert Status Indicator" described in 3GPP specification. Non-critical IEs may include "Support for Two DRX schemes in URA_PCH and CELL_PCH," "MBMS Selected Services," etc., which are described in, for example, TS 25.331, Section10.2.7 (Rel-12). Additional IE(s) 246 may include non-critical IEs that refer to IEs indicating optional operations or status associated with transmission of UE 102. For example, non-critical IEs may include one or both of an IE for Measured Results on Random Access Channel (RACH) and an IE for Support for Two Discontinuous Reception (DRX) Schemes.

Figure 3:
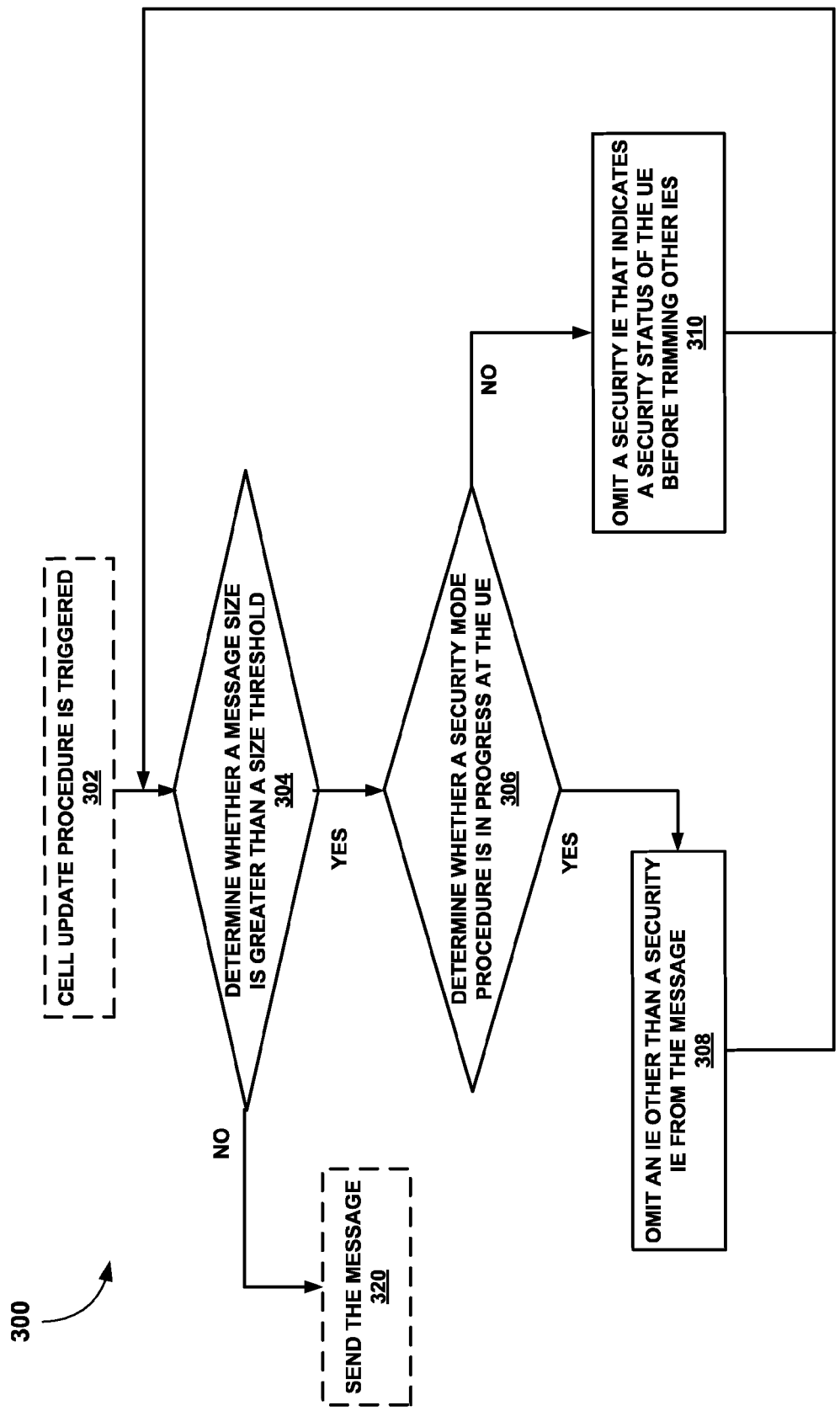
FIG. 3 is a flow chart of aspects of a method for managing a cell update message.

Referring to FIG. 3, aspects of a method 300 for managing cell update messages may be performed by UE 102 of FIG. 1 and the components thereof. In an aspect, UE 102 may perform method 300 when in PCH and FACH state. More particularly, aspects of method 300 may be performed by message size detector 202, security mode manager 204, IE manager 206, and communication component 208 as shown in FIG. 2A. As illustrated in FIG. 3A, dash-lined blocks may indicate optional operations of method 300.

At 302, method 300 includes receiving a message to trigger the cell update procedure when UE 102 is in PCH state. A non-limiting example of the triggering message is a paging type 1 message. The triggering message may cause UE 102 to move to FACH state and start the process described hereafter. For example, communication component 208 and/or transceiver 107 may receive a message from network 104, which triggers the cell update procedure. Upon receiving the message from network 104, UE 102 may move to FACH state.

At 304, method 300 includes determining whether a size of a message, for transmission from a UE to a network, is greater than a size threshold. For example, message size detector 202 may be configured to determine whether the size of the cell update message is greater than the size threshold. If the size of the cell update message is equal to or smaller than the size threshold (e.g., threshold 230 in FIG. 2A), communication component 208 and/or transceiver 107 may send the cell update message without any adjustments or modification (e.g., without omitting IEs) to network 104. If the size of the cell update message is greater than the size threshold, the process may continue to 306. In at least some examples, the size threshold may refer to a size configurable by network 104 based on network configuration, e.g., RACH TFS and Additional RACH TFS for CCCH in TS 25.331.

At 306, method 300 includes determining whether a security mode procedure is in progress at the UE when a determination is made that the size of the message is greater than the size threshold. For example, security mode manager 204 may be configured to determine whether the security mode procedure is in progress. Based on the determination of whether the security mode procedure is in progress, IE manager 206 may be configured to omit the security IE and/or one or more of other non-critical IEs. As described above, non-critical IEs may refer to the IEs indicating optional operations or status associated with transmission of UE 102.

At 308, method 300 includes, when a determination is made that the security mode procedure is in progress, omitting an IE other than a security IE from the message (e.g., message 110 in FIG. 1). For example, IE manager 206 may omit one of the non-critical IEs. The process may revert to block 304 and message size detector 202 may be configured to determine whether the size of the cell update message with the non-critical IE omitted is still greater than the size threshold. If the size is still greater than the size threshold after the non-critical IE is omitted, IE manager 206 may continue to perform aspects of method 300 to omit another non-critical IE, e.g., additional IE 246 (FIG. 2), until all non-critical IEs are omitted or the size of the cell update message is equal to or less than the size threshold.

At 310, method 300 includes, when a determination is made that the security mode procedure is not in progress, omitting a security IE that indicates a security status of the UE before trimming other IEs. For example, IE manager 206 may omit the security IE if the security mode procedure is not in progress. The process may revert to block 304 and message size detector may be configured to determine whether the size of the cell update message with the security IE omitted is still greater than the size threshold.

Figure 4:
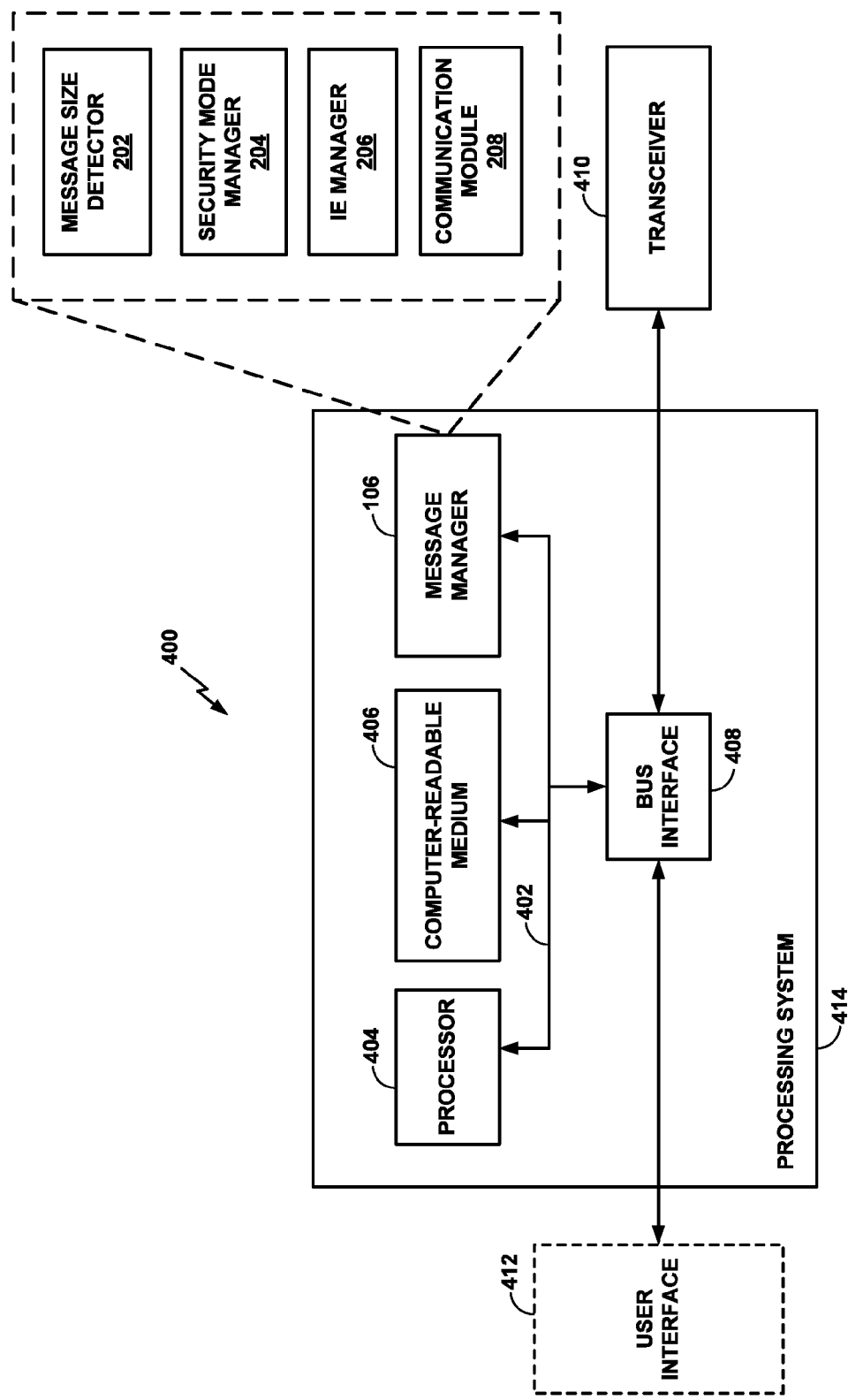
FIG. 4 is a block diagram illustrating an example of a hardware implementation for an apparatus employing a processing system having aspects configured to manage a cell update message.

At 320, method 300 includes sending the message with or without the one or more IEs omitted to the network. That is, if the size of the message with the one or more IEs omitted is less than the size threshold, the message with IEs omitted may be sent to the network. If the original size of the message is less than the size threshold, the message may be sent to the network without any IEs omitted. For example, communication component 208 and/or transceiver 107 may transmit the cell update message with one or more IEs omitted to network 104 if message size detector 202 determines that the size of the cell update message with one or more IEs omitted is equal to or smaller than the size threshold.

communication component 208 Referring to FIG. 4, an example of a hardware implementation for an apparatus 400 employing a processing system 414 having aspects configured to manage cell update messages. In an aspect, apparatus 400 may be UE 102 of FIG. 1, including message manager 106.

In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, one or more communications components, such as, for example, message manager 106 of FIG. 1, and computer-readable media, represented generally by the computer-readable medium 406. The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described herein for any particular apparatus. More particularly, and as described above with respect to FIG. 1, message manager 106 may be software components (e.g., software modules), such that the functionality described with respect to each of the modules may be performed by processor 404.

The computer-readable medium 406 may also be used for storing data that is manipulated by the processor 404 when executing software, such as, for example, software modules used to implement message manager 106.

In one example, the software modules (e.g., any algorithms or functions that may be executed by processor 404 to perform the described functionality) and/or data used therewith (e.g., inputs, parameters, variables, and/or the like) may be retrieved from computer-readable medium 406.

More particularly, the processing system 414 further includes message manager 106, which further includes message size detector 202, security mode manager 204, IE manager 206, and communication component 208 as described above with respect to FIG. 2A. The various components or functionalities provided by message manager 106 (e.g., message size detector 202, security mode manager 204, and other components of the message manger 106) may be performed by software modules running in the processor 404, resident and/or stored in the computer-readable medium 406, one or more hardware modules coupled to the processor 404, or some combination thereof. For example, the message manager 106, the processor 404, and/or the computer-readable medium 406 may have an IE that indicates the security status of the apparatus 400 included in a cell update message when a cell update procedure is triggered during an ongoing security mode procedure. To ensure the size of the cell update message is equal to or smaller than the transport format size, other IEs may be omitted from the cell update message if the security mode procedure is in progress. Alternatively, if the security mode procedure is not in progress, there may not be a need to update the security status of the apparatus 400 and, thus, the IE that indicates the security status may be omitted from the cell update message to reduce the size of the cell update message. In another example, the processor 404, the computer-readable medium 406, and/or the message size detector 202 in the message manager 106 may be configured to determine whether a size of a message to be transmitted from a UE to a network is greater than a size threshold. The processor 404, the computer-readable medium 406, and/or security mode manager 204 in the message manager 106 may be configured to determine, in response to a determination that the size of the message is greater than the size threshold, whether a security mode procedure is in progress at the UE. The processor 404, the computer-readable medium 406, and/or the IE manager 206 in the message manager 106 may be configured to omit from the message one or more information elements (IEs), wherein which one or more IE are omitted is based on the determination of whether the security mode procedure is in progress, and wherein the size of the message with the one or more IEs omitted is smaller than or equal to the size threshold.

Figure 5:
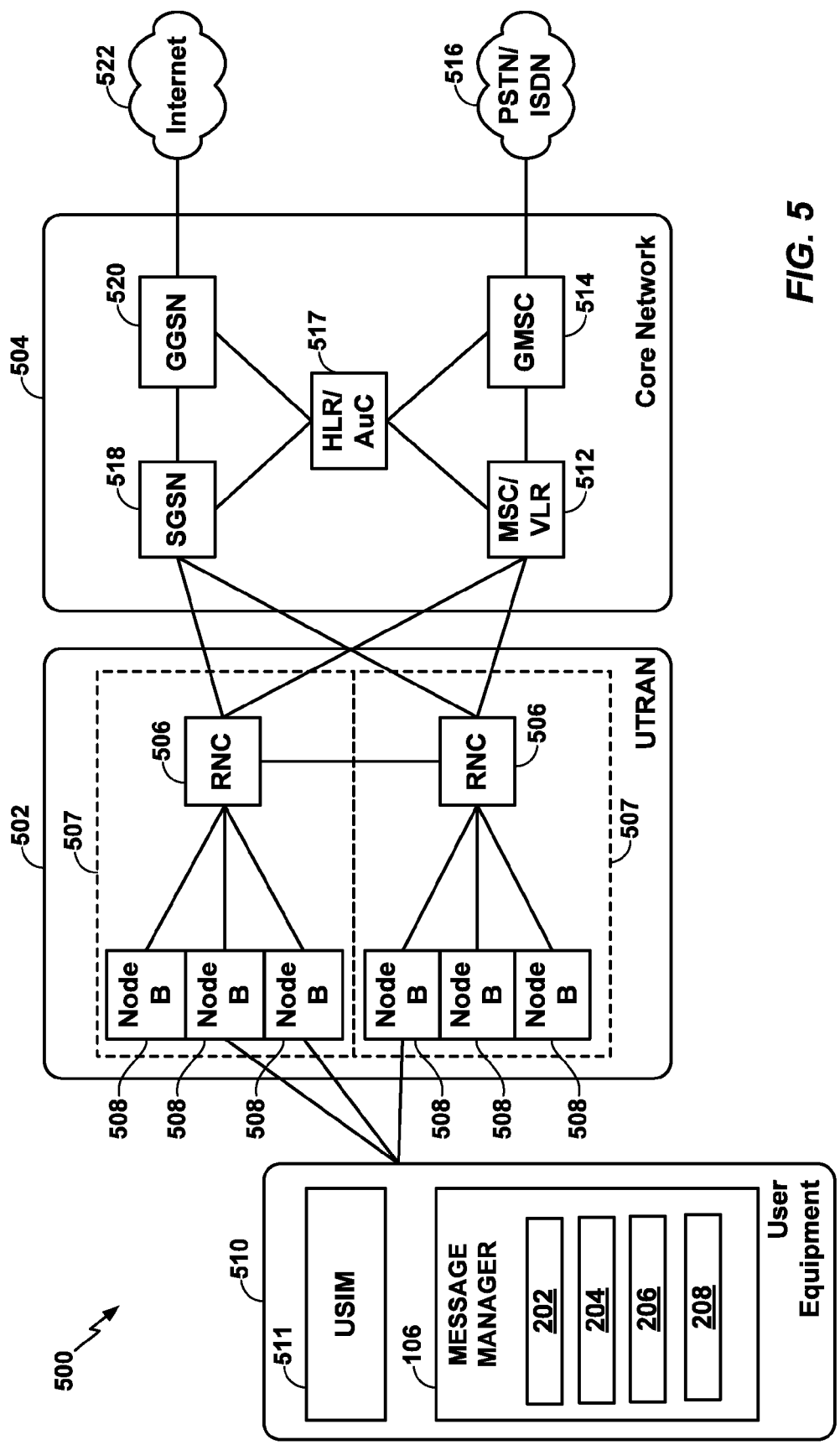
FIG. 5 is a diagram illustrating an example of a telecommunications system having aspects configured to manage a cell update message.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 500 employing a W-CDMA air interface and having aspects configured to manage cell update messages. A UMTS network includes three interacting domains: a Core Network (CN) 504, a UMTS Terrestrial Radio Access Network (UTRAN) 502, and User Equipment (UE) 510. In an aspect, UE 510 may be an example of UE 102 of FIG. 1, including message manager 106 that further includes message size detector 202, security mode manager 204, IE manager 206, and communication component 208. In this example, the UTRAN 502 provides various wireless services including telephony, video, data, messaging, broadcasts, and/or other services. The UTRAN 502 may include a plurality of Radio Network Subsystems (RNSs) such as an RNS 507, each controlled by a respective Radio Network Controller (RNC) such as an RNC 506. Here, the UTRAN 502 may include any number of RNCs 506 and RNSs 507 in addition to the RNCs 506 and RNSs 507 illustrated herein. The RNC 506 is an apparatus responsible for, among other things, assigning, reconfiguring and releasing radio resources within the RNS 507. The RNC 506 may be interconnected to other RNCs (not shown) in the UTRAN 502 through various types of interfaces such as a direct physical connection, a virtual network, or the like, using any suitable transport network.

Communication between a UE 510 and a Node B 508, which may be an example of an entity or component of network 104 of FIG. 1, may be considered as including a physical (PHY) layer and a medium access control (MAC) layer. Further, communication between a UE 510 and an RNC 506 by way of a respective Node B 508 may be considered as including a radio resource control (RRC) layer. For example, UE 510 may be configured to transmit a message with one or more IEs omitted to a Node B 508, or other entity or component of network 104 of FIG. 1. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each RNS 507; however, the RNSs 507 may include any number of wireless Node Bs. The Node Bs 508 provide wireless access points to a CN 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 510 may further include a universal subscriber identity module (USIM) 511, which contains a user's subscription information to a network. For illustrative purposes, one UE 510 is shown in communication with a number of the Node Bs 508. The DL, also called the forward link, refers to the communication link from a Node B 508 to a UE 510, and the UL, also called the reverse link, refers to the communication link from a UE 510 to a Node B 508.

The CN 504 interfaces with one or more access networks, such as the UTRAN 502. As shown, the CN 504 is a GSM core network. However, as those skilled in the art will recognize, the various concepts presented throughout this disclosure may be implemented in a RAN, or other suitable access network, to provide UEs with access to types of CNs other than GSM networks.

The CN 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a VLR that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The CN 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 510 through the SGSN 518, which performs primarily the same functions in the packet-based domain as the MSC 512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 508 and a UE 510. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARM), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 510 provides feedback to the Node B 508 over the HS-DPCCH to indicate whether it correctly decoded a packet on the downlink.

HS-DPCCH further includes feedback signaling from the UE 510 to assist the Node B 508 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the Node B 508 and/or the UE 510 may have multiple antennas supporting MIMO technology. The use of MIMO technology enables the Node B 508 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 510 to increase the data rate or to multiple UEs 510 to increase the overall system capacity. This is achieved by spatially pre-coding each data stream and then transmitting each spatially precoded stream through a different transmit antenna on the downlink. The spatially precoded data streams arrive at the UE(s) 510 with different spatial signatures, which enables each of the UE(s) 510 to recover the one or more the data streams destined for that UE 510. On the uplink, each UE 510 may transmit one or more spatially precoded data streams, which enables the Node B 508 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
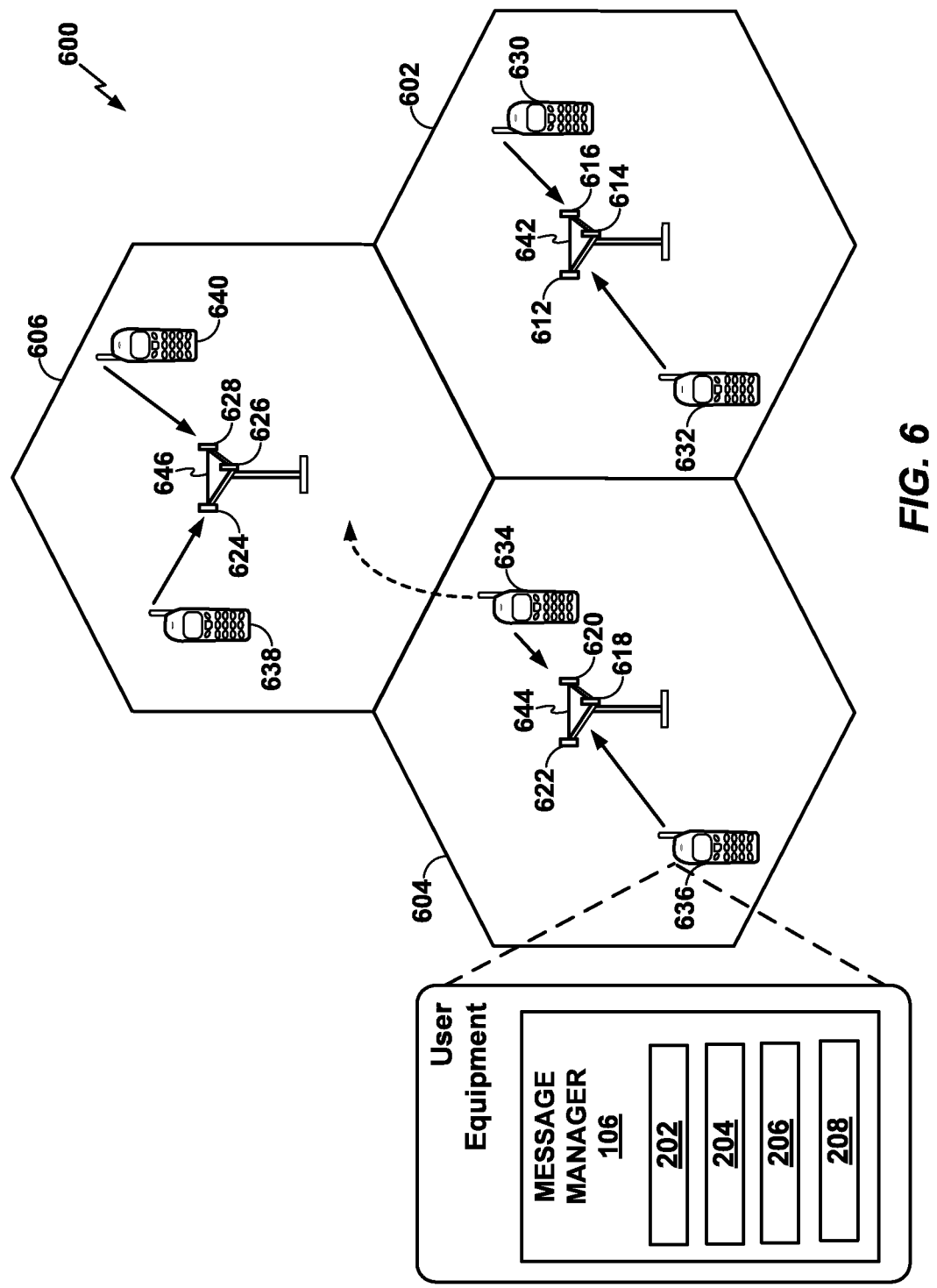
FIG. 6 is a diagram illustrating an example of an access network having aspects configured to manage a cell update message.

Referring to FIG. 6, an access network 600 is in a UTRAN architecture having aspects configured to manage cell update messages. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 618, 620, and 622 each correspond to a different sector. In cell 606, antenna groups 624, 626, and 628 each correspond to a different sector. The cells 602, 604 and 606 may include several wireless communication devices, e.g., User Equipment or UEs, which may be in communication with one or more sectors of each cell 602, 604 or 606. For example, UEs 630 and 632 may be in communication with Node B 642, UEs 634 and 636 may be in communication with Node B 644, and UEs 638 and 640 can be in communication with Node B 646. In an aspect, one of UEs 630, 632, 634, 636, 638, and/or 640 may be an example of UE 102 of FIG. 1 having message manager 106 that further includes message size detector 202, security mode manager 204, IE manager 206, and communication component 208. Here, each Node B 642, 644, and 646 is configured to provide an access point to a CN 504 (see FIG. 5) for all the UEs 630, 632, 634, 636, 638, 640 in the respective cells 602, 604, and 606. In an aspect, Node Bs 642, 644, and 646 may be examples of Node Bs including network 104 of FIG. 1.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (see FIG. 5), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set).

The modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 7.

Figure 7:
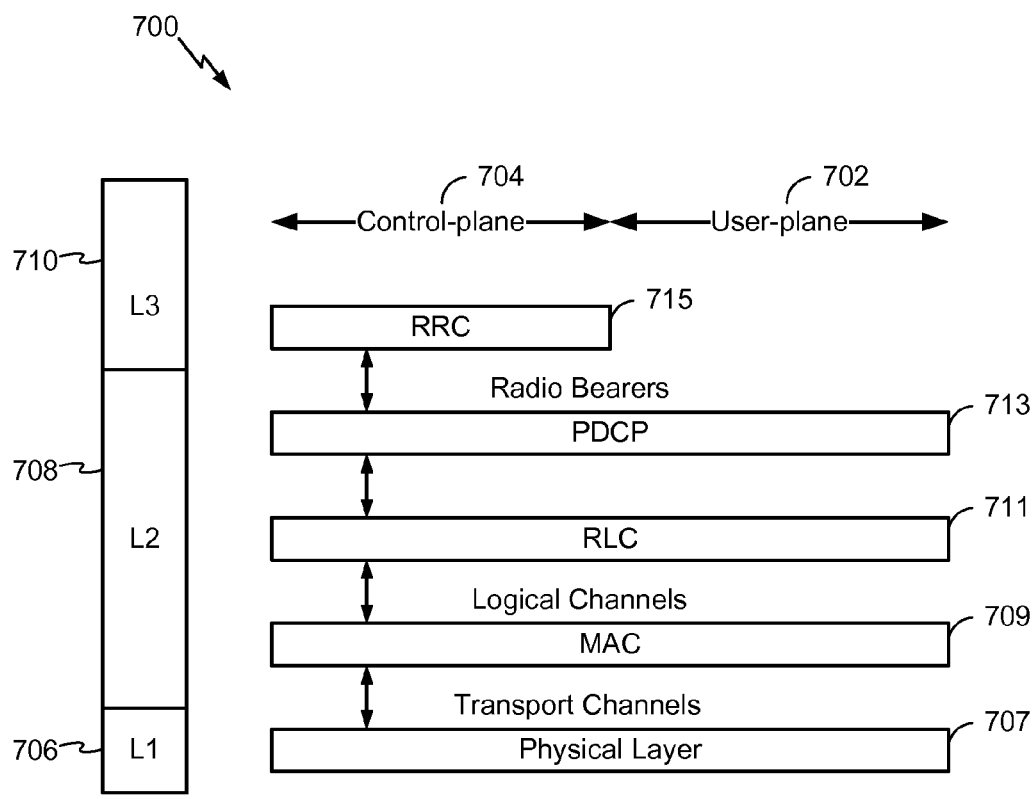
FIG. 7 is a diagram illustrating an example of a radio protocol architecture for user and control planes for cell update message management.

Referring to FIG. 7, an example radio protocol architecture 700 relates to the user plane 702 and the control plane 704 of a user equipment (UE) or Node B/base station in communication with one another and having aspects configured to manage cell update messages. In an aspect, architecture 700 may be included in a UE such as UE 102 of FIG. 1 having message manager 106. In an aspect, architecture 700 may be included in a network, such as network 104 of FIG. 1. The radio protocol architecture 700 for the UE and Node B is shown with three layers: Layer 1 706, Layer 2 708, and Layer 3 710. Layer 1 706 is the lowest lower and implements various physical layer signal processing functions. As such, Layer 1 706 includes the physical layer 707. Layer 2 (L2 layer) 708 is above the physical layer 707 and is responsible for the link between the UE and Node B over the physical layer 707. Layer 3 (L3 layer) 710 includes a radio resource control (RRC) sublayer 715. The RRC sublayer 715 handles the control plane signaling of Layer 3 between the UE and the UTRAN.

In the user plane, the L2 layer 708 includes a media access control (MAC) sublayer 709, a radio link control (RLC) sublayer 711, and a packet data convergence protocol (PDCP) 713 sublayer, which are terminated at the Node B on the network side. Although not shown, the UE may have several upper layers above the L2 layer 708 including a network layer (e.g., IP layer) that is terminated at a PDN gateway on the network side, and an application layer that is terminated at the other end of the connection (e.g., far end UE, server, etc.).

The PDCP sublayer 713 provides multiplexing between different radio bearers and logical channels. The PDCP sublayer 713 also provides header compression for upper layer data packets to reduce radio transmission overhead, security by ciphering the data packets, and handover support for UEs between Node Bs. The RLC sublayer 711 provides segmentation and reassembly of upper layer data packets, retransmission of lost data packets, and reordering of data packets to compensate for out-of-order reception due to hybrid automatic repeat request (HARM). The MAC sublayer 709 provides multiplexing between logical and transport channels. The MAC sublayer 709 is also responsible for allocating the various radio resources (e.g., resource blocks) in one cell among the UEs. The MAC sublayer 709 is also responsible for HARQ operations.

Figure 8:
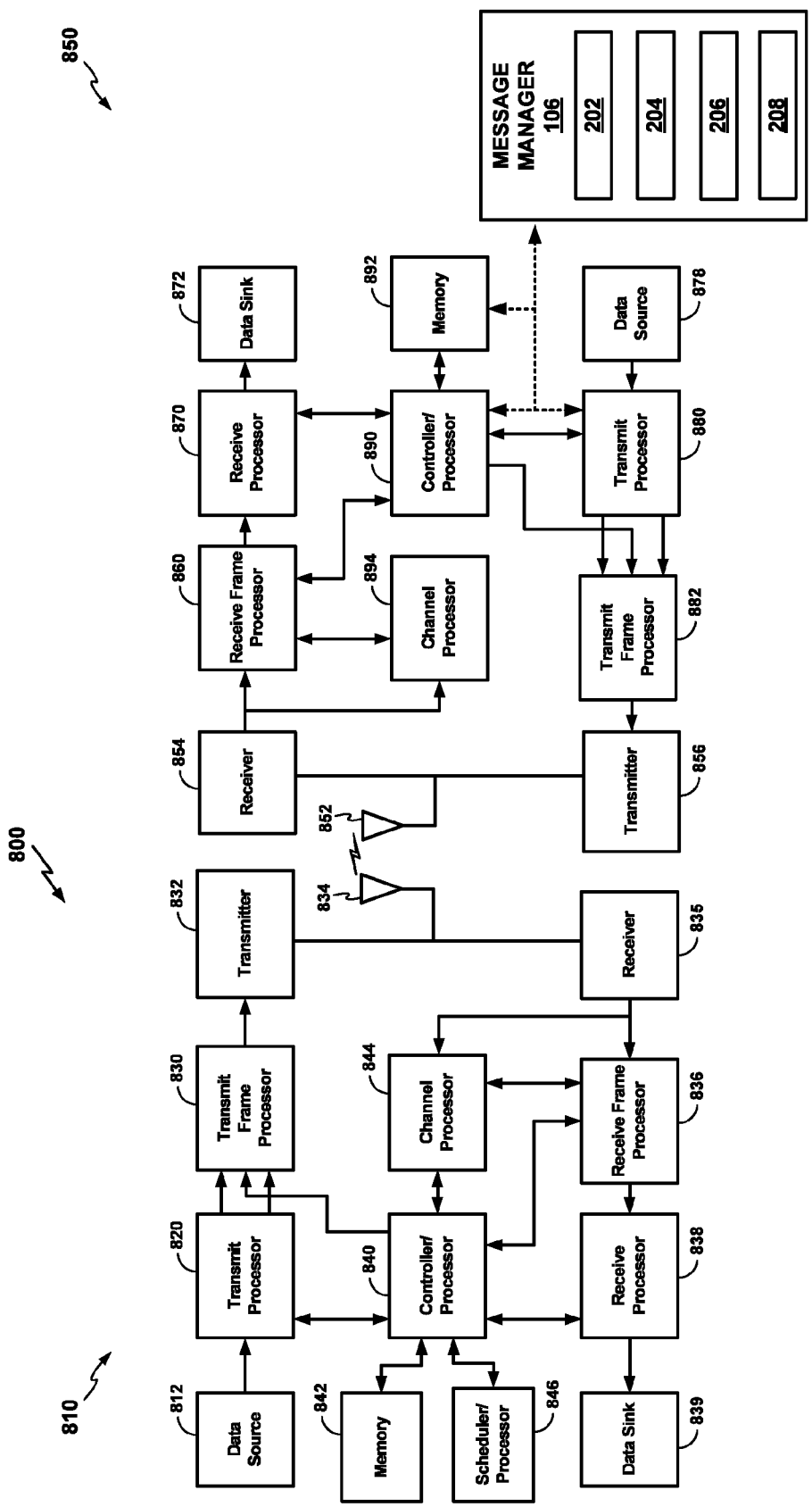
FIG. 8 is a block diagram illustrating an example of a base station (e.g., Node B) in communication with a UE in a telecommunications system having aspects configured to manage a cell update message.

Referring to FIG. 8, a Node B 810 is in communication with a UE 850 and having aspects configured to manage cell update messages. In an aspect, the Node B 810 may be an example of a base station associated with network 104 of FIG. 1. In an aspect, the UE 850 may be an example of UE 102 of FIG. 1 having message manager 106 that further includes message size detector 202, security mode manager 204, IE manager 206, and communication component 208. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. In this disclosure, the term "component" may be used interchangeably with the term "module."

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, components, processors, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Further more, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing a cell update message, comprising:
    determining whether a size of a message to be transmitted from a user equipment (UE) to a network is greater than a size threshold;
    determining, in response to a determination that the size of the message is greater than the size threshold, whether a security mode procedure is in progress at the UE;
        in accordance with a determination that the security mode procedure is not in progress, omitting from the message a security information element (IE) having an omission priority higher than at least one additional IE and that indicates a security status of the UE; and
        in accordance with a determination that the security mode procedure is in progress, omitting from the message an IE other than the security IE that indicates a security status of the UE;
    wherein the size of the message with the one or more IEs omitted is smaller than or equal to the size threshold.

2. The method of claim 1, further comprising:
    transmitting, to the network, the message with the one or more IEs omitted.

3. The method of claim 1, further comprising:
    determining whether the size of the message with the security IE omitted is greater than the size threshold;
    in response to a determination that the size of the message with the security IE omitted is greater than the size threshold, omitting from the message one or more additional IEs until the size of the message with the security IE omitted and with the one or more additional IEs omitted is smaller than or equal to the size threshold; and
    transmitting to the network the message with the security IE omitted and with the one or more additional IEs omitted.

4. The method of claim 3, wherein the security IE includes a Security Revert Status Indicator IE.

5. The method of claim 3, wherein the one or more additional IEs includes one or both of:
    an IE for Measured Results on Random Access Channel (RACH), and
    an IE for Support for Two Discontinuous Reception (DRX) Schemes.

6. The method of claim 1, further comprising:
    determining whether the size of the message with the security IE omitted is greater than the size threshold; and
    in response to a determination that the size of the message with the security IE omitted is smaller than or equal to the size threshold, transmitting to the network the message with the security IE omitted.

7. The method of claim 1, further comprising:
    determining whether the size of the message with the IE omitted is greater than the size threshold; and
    in response to a determination that the size of the message with the IE omitted is greater than the size threshold, further omitting the security IE from the message.

8. The method of claim 1, further comprising:
determining whether the size of the message with the IE omitted is greater than the size threshold; and
in response to a determination that the size of the message with the IE omitted is smaller than or equal to the size threshold, transmitting to the network the message with the IE omitted.

9. The method of claim 1, wherein the security mode procedure includes a process to adjust one or more parameters related to a security status of the UE.

10. An apparatus for managing information elements in a cell update message, comprising:
means for determining whether a size of a message to be transmitted from a user equipment (UE) to a network is greater than a size threshold;
means for determining, in response to a determination that the size of the message is greater than the size threshold, whether a security mode procedure is in progress at the UE;
in accordance with a determination that the security mode procedure is not in progress, means for omitting from the message a security information element (IE) having an omission priority than at least one additional IE and that indicates a security status of the UE; and
in accordance with a determination that the security mode procedure is in progress, means for omitting from the message an IE other than the security IE that indicates a security status of the UE;
wherein the size of the message with the one or more IEs omitted is smaller than or equal to the size threshold.

11. The apparatus of claim 10, further comprising means for transmitting to the network the message with the one or more IEs omitted.

12. The apparatus of claim 10, further comprising:
means for determining whether the size of the message with the security IE omitted is greater than the size threshold;
means for omitting from the message one or more additional IEs until the size of the message with the security IE omitted and with the one or more additional IEs omitted is smaller than or equal to the size threshold in response to a determination that the size of the message with the security IE omitted is greater than the size threshold; and
means for transmitting to the network the message with the security IE omitted and with the one or more additional IEs omitted.

13. The apparatus of claim 12, wherein the security IE includes a Security Revert Status Indicator IE.

14. The apparatus of claim 12, wherein the one or more additional IEs includes one or both of:
an IE for Measured Results on Random Access Channel (RACH), and
an IE for Support for Two Discontinuous Reception (DRX) Schemes.

15. The apparatus of claim 10, further comprising:
means for determining whether the size of the message with the security IE omitted is greater than the size threshold; and
means for transmitting to the network the message with the security IE omitted in response to a determination that the size of the message with the security IE omitted is smaller than or equal to the size threshold.

16. The apparatus of claim 10,
means for determining whether the size of the message with the IE omitted is greater than the size threshold; and
means for further omitting the security IE from the message in response to a determination that the size of the message with the IE omitted is greater than the size threshold.

17. The apparatus of claim 10, further comprising:
means for determining whether the size of the message with the IE omitted is greater than the size threshold; and
means for transmitting to the network the message with the IE omitted in response to a determination that the size of the message with the IE omitted is smaller than or equal to the size threshold.

18. The apparatus of claim 10, wherein the security mode procedure includes a procedure to adjust one or more parameters related to a security status of the UE.

19. A non-transitory computer-readable medium storing computer executable code for managing information elements in a cell update message, comprising:
code for determining whether a size of a message to be transmitted from a user equipment (UE) to a network is greater than a size threshold;
code for determining, in response to a determination that the size of the message is greater than the size threshold, whether a security mode procedure is in progress at the UE;
in accordance with a determination that the security mode procedure is not in progress, code for omitting from the message a security information element (IE) having an omission priority higher than at least one additional IE that indicates a security status of the UE; and
in accordance with a determination that the security mode procedure is in progress, code for omitting from the message an IE other than the security IE that indicates a security status of the UE;
wherein the size of the message with the one or more IEs omitted is smaller than or equal to the size threshold.

20. The non-transitory computer-readable medium of claim 19, further comprising:
code for transmitting to the network the message with the one or more IEs omitted.

21. The non-transitory computer-readable medium of claim 19, further comprising:
code for determining whether the size of the message with the security IE omitted is greater than the size threshold;
code for omitting from the message one or more additional IEs until the size of the message with the security IE omitted and with the one or more additional IEs omitted is smaller than or equal to the size threshold, in response to a determination that the size of the message with the security IE omitted is greater than the size threshold; and
code for transmitting to the network the message with the security IE omitted and with the one or more additional IEs omitted.

22. The non-transitory computer-readable medium of claim 21, wherein the security IE includes a Security Revert Status Indicator IE.

23. The non-transitory computer-readable medium of claim 21, wherein the one or more additional IEs includes one or both of:
an IE for Measured Results on Random Access Channel (RACH), and an IE for Support for Two Discontinuous Reception (DRX) Schemes.

24. The non-transitory computer-readable medium of claim 19, further comprising:
code for determining whether the size of the message with the security IE omitted is greater than the size threshold; and
code for transmitting to the network the message with the security IE omitted in response to a determination that the size of the message with the security IE omitted is smaller than or equal to the size threshold.

25. The non-transitory computer-readable medium of claim 19, further comprising:
code for determining whether the size of the message with the IE omitted is greater than the size threshold; and
code for further omitting the security IE from the message in response to a determination that the size of the message with the IE omitted is greater than the size threshold.

26. The non-transitory computer-readable medium of claim 19, further comprising:
code for determining whether the size of the message with the IE omitted is greater than the size threshold; and
code for transmitting to the network the message with the IE omitted in response to a determination that the size of the message with the IE omitted is smaller than or equal to the size threshold.

27. The non-transitory computer-readable medium of claim 19, wherein the security mode procedure includes a process to adjust one or more parameters related to a security status of the UE.

28. The method of claim 1, wherein the size threshold corresponds to a transport format size.

29. An apparatus for managing information elements in a cell update message, comprising:
a memory; and
at least one processor coupled to the memory, the at least one processor configured to:
determine whether a size of a message to be transmitted from a user equipment (UE) to a network is greater than a size threshold;
determine, in response to a determination that the size of the message is greater than the size threshold, whether a security mode procedure is in progress at the UE;
in accordance with a determination that the security mode procedure is not in progress, omit from the message a security information element (IE) having an omission priority higher than at least one additional IE and that indicates a security status of the UE; and
in accordance with a determination that the security mode procedure is in progress, omit from the message an IE other than the security IE that indicates a security status of the UE;
wherein the size of the message with the one or more IEs omitted is smaller than or equal to the size threshold.

30. The apparatus of claim 29, wherein the at least one processor is configured to transmit the message to the network with the one or more IEs omitted.

31. The apparatus of claim 29, wherein the at least one processor is further configured to:
determine whether the size of the message with the security IE omitted is greater than the size threshold;
in response to a determination that the size of the message with the security IE omitted is greater than the size threshold, omit from the message one or more additional IEs until the size of the message with the security IE omitted and with the one or more additional IEs omitted is smaller than or equal to the size threshold; and
transmit to the network the message with the security IE omitted and with the one or more additional IEs omitted.

32. The apparatus of claim 31, wherein the security IE includes a Security Revert Status Indicator IE.

33. The apparatus of claim 31, wherein the one or more additional IEs includes one or both of:
an IE for Measured Results on Random Access Channel (RACH),
and an IE for Support for Two Discontinuous Reception (DRX) Schemes.

34. The apparatus of claim 29, wherein the at least one processor is further configured to:
determine whether the size of the message with the security IE omitted is greater than the size threshold; and
in response to a determination that the size of the message with the security IE omitted is smaller than or equal to the size threshold, transmit to the network the message with the security IE omitted.

35. The apparatus of claim 29, wherein the at least one processor is further configured to:
determine whether the size of the message with the IE omitted is greater than the size threshold; and
in response to a determination that the size of the message with the IE omitted is greater than the size threshold, further omit the security IE from the message.

36. The apparatus of claim 29, wherein the at least one processor is further configured to:
determine whether the size of the message with the IE omitted is greater than the size threshold; and
in response to a determination that the size of the message with the IE omitted is smaller than or equal to the size threshold, transmit to the network the message with the IE omitted.

37. The apparatus of claim 29, wherein the security mode procedure includes a procedure to adjust one or more parameters related to a security status of the UE.

* * * * *